Figure 1:
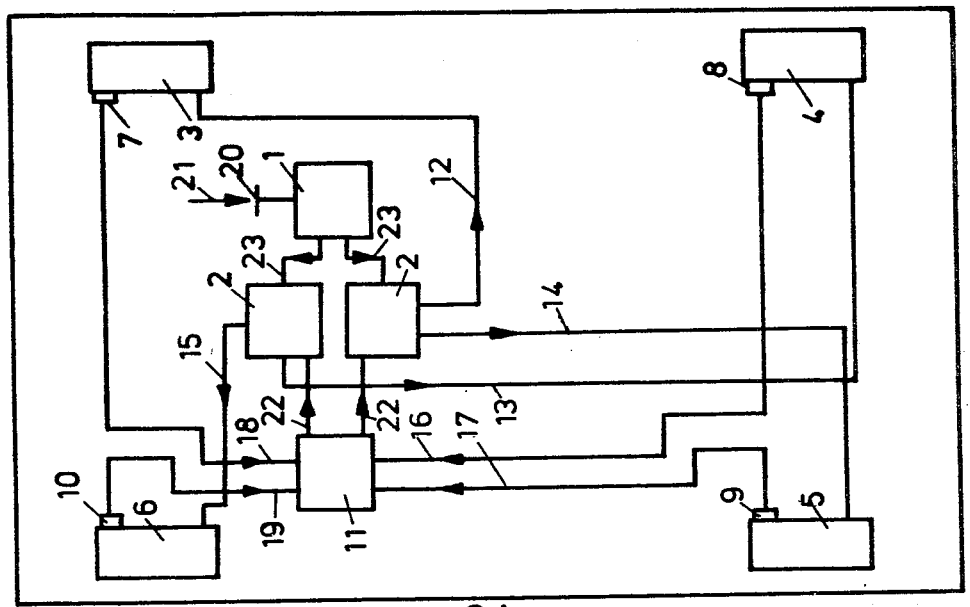

United States Patent [19]

Gygax

[11] 4,451,096
[45] May 29, 1984

[54] BRAKE SYSTEM ANTILOCKING MECHANISM

[75] Inventor: Johannes Gygax, Benken, Switzerland

[73] Assignee: ITT Industries, Inc., New York, N.Y.

[21] Appl. No.: 320,137

[22] Filed: Nov. 10, 1981

[30] Foreign Application Priority Data

Nov. 11, 1980 [CH] Switzerland .......................... 8348/80

[51] Int. Cl.³ ............................................... B60T 8/10
[52] U.S. Cl. .................................. 303/109; 188/181 C
[58] Field of Search .............. 188/181 C; 303/20, 94, 303/95, 96, 97, 99, 104, 106, 115

[56] References Cited

U.S. PATENT DOCUMENTS

| | | | |
|---|---|---|---|
| 3,450,444 | 6/1969 | Ballard | 188/181 C X |
| 3,493,271 | 2/1970 | Douglas | 188/181 C X |
| 3,764,182 | 10/1973 | Andreyko et al. | 188/181 C X |
| 3,909,070 | 9/1975 | Leiber | 303/109 |

*Primary Examiner*—Duane A. Reger
*Attorney, Agent, or Firm*—James B. Raden; William J. Michals

[57] ABSTRACT

In an antilock system for vehicle brake control, the wheel having the worst road contact is disregarded and the remaining wheel brake pressures are regulated in accordance with the "select-low" principle. In a brake system which is divided into two circuits each controlling diagonally opposite wheels, the circuit containing the minimum contact wheel is regulated according to "select-low". In this way, the assignment of the wheel to the group regulated at select-high will be optimized.

5 Claims, 2 Drawing Figures

BRAKE SYSTEM ANTILOCKING MECHANISM

SPECIFICATION

This invention relates to a antilocking apparatus for a vehicle brake system in which braking pressure is controlled in accordance with the retardation of certain wheels of the vehicle.

BACKGROUND OF THE INVENTION

It has been known, for the antilocking regulation of the wheels of a vehicle, not to regulate all wheels individually, but, according to the discretion of the designer, to equip certain groups of wheels with a single regulating arrangement wherein, in such a case, the regulation takes place in response to the selection of one of the sensor signals of the jointly regulated wheels.

This selection can be accomplished, for example, in accordance with the "select-low" principle, which means that the signal from the sensor associated with the wheel braked or retarded most strongly is chosen for regulation. The reason for this is that the more weakly retarded wheels have greater frictional values relative to the road surface and, if one of these wheels were selected, the control would cause the wheel retarded most strongly to lock. In this case, therefore, several wheels are regulated at an equal braking pressure which is valid for the wheel having the least contact with the road surface, so that the non-utilization of the greater braking action of the other wheel or other wheels is tolerated in order to prevent locking of the wheel having the least contact with the road.

The antilocking mechanisms hitherto known have, however, the disadvantage that the assignment of wheels to a certain group which is then regulated as a whole according to the "select-low" principle, is fixed, which arrangement is unfavorable for covering all possibilities of the different loads on the wheels during braking actions. Thus, there will always be situations for which the selected division is not optimal.

BRIEF DESCRIPTION OF THE INVENTION

Accordingly, it is an object of the present invention, while maintaining the advantage of the saving of material in the arrangement where groups of wheels are formed for regulation on the "select-low" principle, of providing an additional possibility for the optimization of the brake system pressure medium distribution to the regulated wheels.

Briefly described, the invention includes a vehicle brake system antilocking mechanism of the type having at least one modulator regulating the braking fluid pressure in dependence on wheel retardation and having wheel sensors, wherein there are fewer modulators than wheels or sensors, and wherein the braking pressure to at least one group of wheels is regulated according to the "select-low" principle, comprising the combination of means for identifying the wheel which has been retarded most strongly; control means for selecting the wheel or wheels in accordance with the "select-low" principle as a function of the position of the wheel retarded most strongly and for regulating braking pressure in accordance with that selection.

Figure 2:
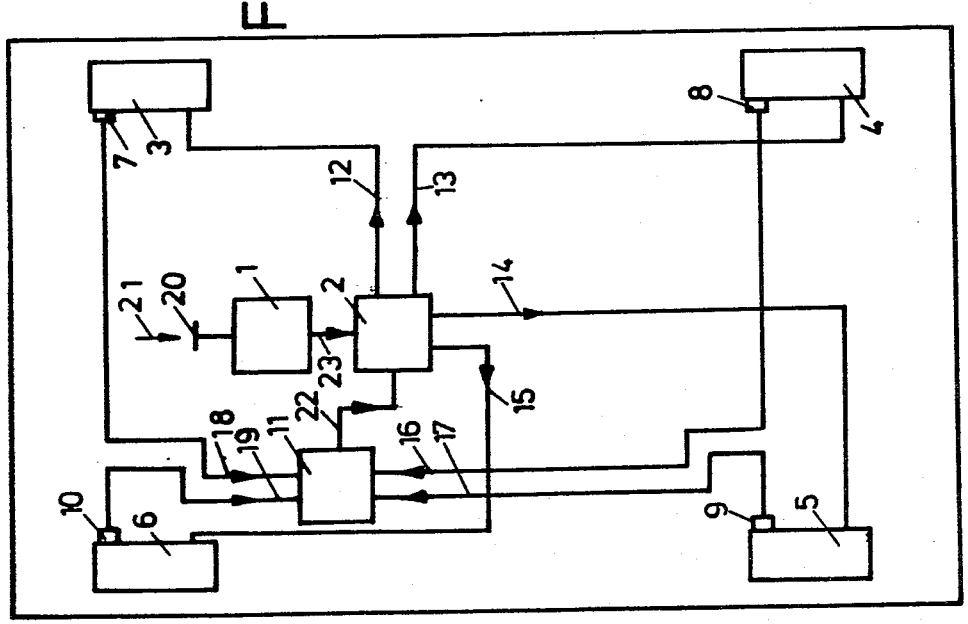

In order that the manner in which the foregoing and other objects are attained in accordance with the invention can be understood in detail, particularly advantageous embodiments thereof will be described with reference to the accompanying drawings, which form a part of this specification and wherein:

FIG. 1 is a schematic fluid and electrical circuit diagram of an antilocking system having a single modulator for all four wheels; and FIG. 2 is a schematic electrical and fluid diagram of a system for a diagonal dual circuit brake installation.

In each of FIGS. 1 and 2, a vehicle is shown schematically, and the parts which are essential to the invention will be described in the following discussion. Referring first to FIG. 1, the apparatus includes a main brake cylinder 1 in which the brake fluid is put under pressure by means of activating the brake pedal 20 in the direction of the arrow 21, and the brake fluid is then fed through a line 23 to an antilocking modulator (ALM) 2. The modulator has four outlets, or one outlet with a quadruple distributor, and is connected with the brake mechanisms of wheels 3, 4, 5 and 6 through fluid lines 12, 13, 14 and 15, respectively, which wheels are braked by means of conventional brake mechanisms operated by the fluid and not illustrated.

The wheels are provided with sensors 7, 8, 9 and 10, each sensor being capable of producing a signal representative of the rate of braking or deceleration of its associated wheel, permitting measurement of that factor. From sensors 7–10, signal lines 16–19 are connected to a recognizing or detection arrangement 11 in which one of the four sensor signals is selected and is converted into a control signal. The control signal thus formed is fed through a line 22 to the antilocking modulator 2. In FIG. 2, the above components are also present, except that the control signal is delivered on lines 22 and 22' to antilocking modulators 2 and 2', respectively.

The manner in which the apparatus illustrated in FIG. 1 operates will now be described. In the case of a vehicle which, when standing at rest, has substantially equal axle loads on the front and rear axles, it will be recognized that the distribution of the load shifts when the vehicle is moving and is subjected to braking force so that the load on the front axle is significantly greater than that on the rear axle. The following discussion will proceed from this usual circumstance, although it will be recognized that unequal loads can occur and that the system will function in such situations. It will also be assumed, in the following discussion, that a change of direction of the vehicle, for example to the left, takes place simultaneously with the braking.

It has been known that when the vehicle is driving around a curve the outside wheels are put under greater stress than the inside wheels, so that, therefore, in the event of braking during a left-hand curve, the right, front, outside wheel 3 is placed under the highest stress, the adjacent wheels 4 and 6 are put under medium stress, and the rear inside wheel 5 is subjected to the least stress.

The wheel put under the least stress transmits the smallest braking force onto the road and, in the event of excessive braking action (and an antilocking arrangement is provided only for such circumstances) will have a negligible effect on the velocity reduction of the vehicle. As a consequence of that, it will be recognized that even if this wheel 5 which is under the least stress, does lock, that will have no negative effects on the braking behavior of the vehicle, on the stability of travel, or on the steerability of the vehicle.

For this purpose, recognition arrangement 11 is arranged to identify and recognize the wheel subjected to smallest stress and to exclude that wheel from any influence on the regulation of the braking system. Of the three remaining wheels 3, 4, and 6, one is under strong stress and the other two under a less great stress and in a good or at least fair frictional contact with the road surface.

These three wheels are now regulated according to the "select-low" principle, that is to say, the wheel being braked or retarded most strongly, or being under the least stress, or having the worst frictional contact of the three with the road is taken to be a measure for the pressure decrease in the brake cylinders of all three wheels. This selected wheel, in the case of braking occurring during a left-hand turn, is either wheel 4 or wheel 6, depending upon whether the load distribution on the axles is changed more strongly or less strongly by the braking than by the shifting of the load from the inside to the outside wheels as a result of going around the curve. The four wheels regulated jointly, therefore, all have the same braking pressure which is selected such that the wheel endangered most strongly by locking is locked and the wheel which is second most in danger of locking is not locked.

As will be recognized, in the case of the vehicle making a right-hand curve, what was described above is valid with a corresponding interchange of left and right.

In the case of straight ahead travel, or in the case of a very slight curve, it will necessary, especially with vehicles having a relatively great load on their front axles, for some safety device to be inserted which additionally influences the braking force regulation.

In this situation both rear wheels would be under a very weak load in the event of strong braking, so that the wheel which, perchance, would be the weaker one would be eliminated and the other one which is still under too small a load in order to be used for antilocking regulation, would in this case cause too small a braking force of the remaining three wheels. In this case, for example, the braking installation on the rear wheels can be additionally equipped with a braking pressure limiter which, depending on the type of vehicle, limits the braking pressure to a fixed value or to a maximum value which is regulated as a function of the axle load.

In the event of excessive braking actions (which occur rarely) in the event of reverse travel, what was described previously will be valid with a suitable interchange of front and rear wheels. Furthermore, this principle is not only applicable in the case of traveling around curves but also in the case of other variable conditions of friction of the wheels with the road surface which might occur.

In FIG. 2 is shown a braking installation with a diagonal distribution of two braking circuits, and the components, for the most part, use the same reference numbers as those employed in connection with FIG. 1, the components being essentially the same.

Two antilocking modulators 2 and 2' are connected with the main cylinder 1 by way of lines 23, 23'. Each of these modulators has two outlets, the two outlets of each modulator being connected with the brake cylinders of two diagonally opposite wheels.

The operation of the apparatus of FIG. 2 will now be described. It will again be assumed that we are considering a vehicle which is braking during a left-hand curve, in which case wheel 3 is placed under the highest stress and wheel 5 under the smallest stress. The braking circuit is selected by means of the recognition mechanism 11 which recognizes the wheel 5 to be under the weakest load and therefore produces a control signal selecting the braking circuit operated by modulator 2', and this modulator is switched to "select high", that is to say, the right-hand front wheel 3 is braked optimally and the left-hand rear wheel 5 will be braked at the same time with a correspondingly strong brake pressure which may lead to locking. But, however, this locking is insignificant since we are dealing with the wheel which is under the least stress. The other braking circuit operated by modulator 2 and the wheels 4 and 6 is switched to "select-low", as result of which the modulator regulates in such a way that the wheel most inclined to lock would just be the one which does not lock.

In the case of the system of FIG. 2, the additional safety feature for straight ahead travel is not necessary since both front wheels are braked sufficiently strongly and no essential part of the braking capability of the braking installation is lost. On the other hand, in the case of this system, and depending upon the design of the steering geometry of the vehicle, it may be necessary to insert a limiting arrangement which keeps the difference between the braking pressures in the two braking circuits below a predetermined or predeterminable threshold value, depending upon the type of vehicle. With that, the result is that the difference between the braking forces of the two front wheels will never be so great for the vehicle in which the system is installed that the travel stability will no longer be guaranteed.

In either of these types of installations under consideration, therefore, it is uncertain from the outset for which wheels a "select-low" principle will be used, but by recognition of the wheel which is least important for good braking action and permitting locking among the remaining wheels, the group of "select-low" regulated wheels will be determined depending only upon the position of the wheel which is not to be considered further.

While certain advantageous embodiments have been chosen to illustrate the invention it will be understood by those skilled in the art that various changes and modifications can be made therein without departing from the scope of the invention as defined in the appended claims.

What is claimed is:

1. A vehicle brake system antilocking mechanism of the type having at least one modulator regulating the braking pressure in dependence on wheel retardation and having wheel sensors, wherein there are fewer modulators than wheels or sensors, and wherein the braking pressure to at least one group of wheels is regulated according to the "select-low" principle, comprising in combination:

means for identifying the wheel which has been retarded most strongly;

control means responsive to the identifying means for selecting the wheel or wheels in said one group of wheels in accordance with said "select-low" principle and as a function of the position and to the exclusion of the wheel retarded most strongly; and, means responsive to said control means for regulating braking pressure in accordance with the selection made by said control means.

2. An antilocking mechanism according to claim 1 which includes a single modulator for a four-wheel vehicle and wherein, after identification of a first wheel which is retarded most strongly, and wherein said control means regulates braking pressure to the remaining three wheels in accordance with the "select-low" principle.

3. An antilocking mechanism according to claim 1 wherein, in a four-wheel vehicle, the brake circuits are divided into two circuits so that each circuit serves diagonally opposite wheels, said control means regulates the circuit serving the most strongly retarded wheel with greatest braking pressure and the other circuit with least braking pressure.

4. An antibody mechanism according to claim 3 and further including
means for limiting the pressure difference between the two circuits to a predetermined level.

5. An antilocking mechanism in accordance with any of claims 1 through 4 and further comprising
independent braking pressure regulator means for limiting the braking pressure applied to the rear wheels to avoid locking of the rear wheels.

* * * * *